March 3, 1942.  J. P. BURKE  2,274,976

NUT

Filed Nov. 10, 1941  2 Sheets-Sheet 1

INVENTOR.
James P. Burke
BY
Attorney

March 3, 1942.  J. P. BURKE  2,274,976
NUT
Filed Nov. 10, 1941  2 Sheets-Sheet 2
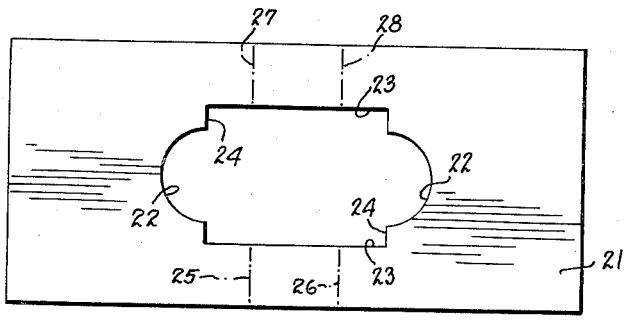
Fig.10.
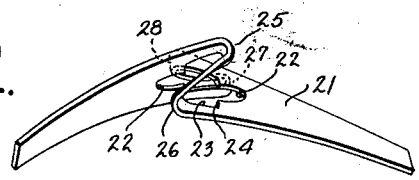
Fig.11.
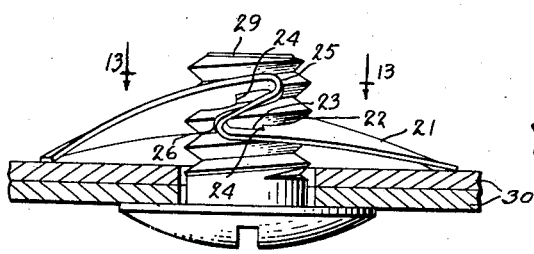
Fig.12.
Fig.13.
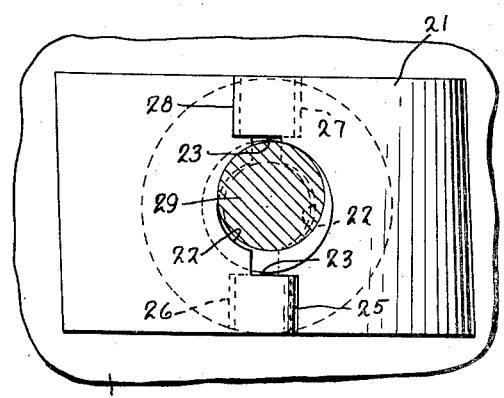
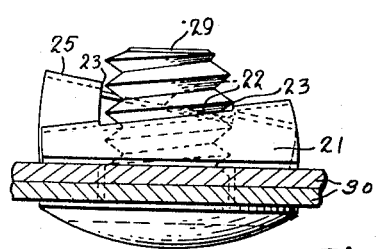
Fig.14.
INVENTOR.
James P. Burke
BY
Attorney Patented Mar. 3, 1942

2,274,976

UNITED STATES PATENT OFFICE 2,274,976

NUT

James P. Burke, Struthers, Ohio, assignor to F. L. McLaughlin, Detroit, Mich.

Application November 10, 1941, Serial No. 418,446

13 Claims. (Cl. 85—36)

This invention relates to nuts of the type known as clinch nuts wherein the nut itself has self-locking characteristics and has for its object to provide an improved nut applicable to threaded bolts and also to posts such as may be made of plastic material.

An object of the invention is to provide a nut which may be made from ordinary cold rolled sheet steel merely by stamping and forming operations.

Another object is to provide a sheet metal nut bent into a formation giving two leads for threads and into which a threaded bolt may be readily inserted by finger pressure, the portions at diametrically opposite sides of the threads crowding thereinto to constitute themselves into a locking means opposing reverse rotation of the bolt.

Another object is to provide a sheet metal nut having opposed spaced arcuate portions adapted to contact different bolt threads or bolt notches, the arcuate portions being connected together to provide maximum strength.

Other objects and advantages will become more fully apparent as reference is had to the accompanying drawings wherein my invention is illustrated, and in which.

Figure 1:
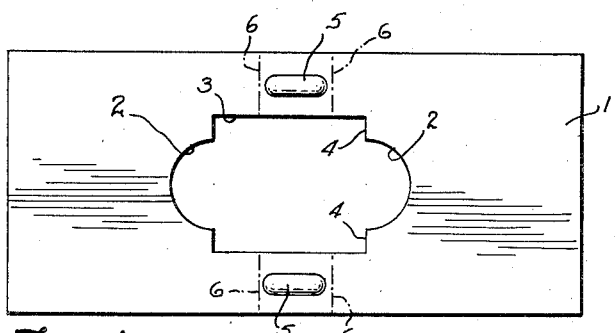
Fig. 1 is a top plan view of a blank, stamped and ready for folding.
Figure 5:
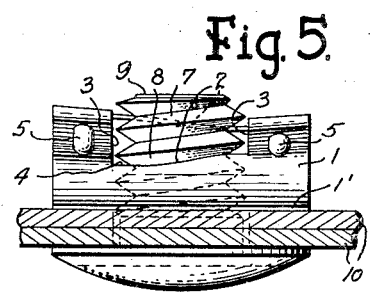
Figure 2:
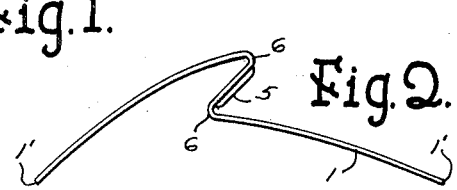
Fig. 2 is a side elevation of blank of Fig. 1 folded into a nut.
Figure 3:
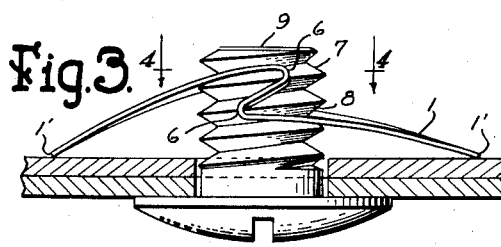
Figure 4:
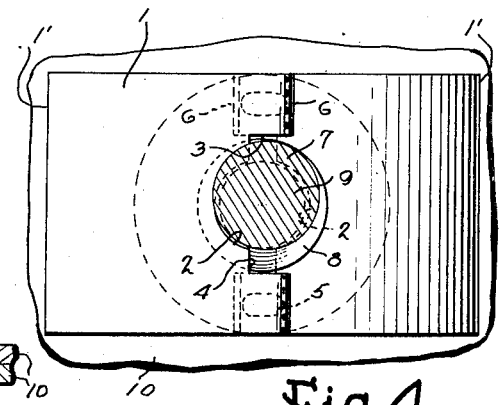
Figure 6:
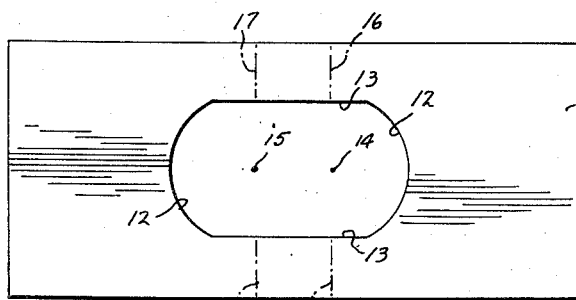
Figure 9:
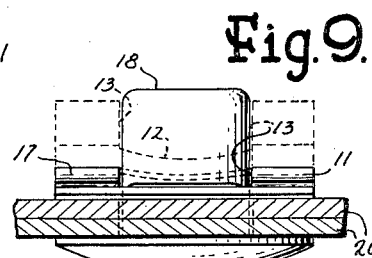
Figure 7:
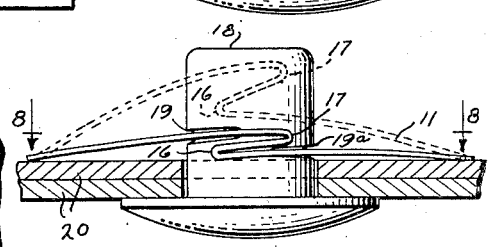
Figure 8:
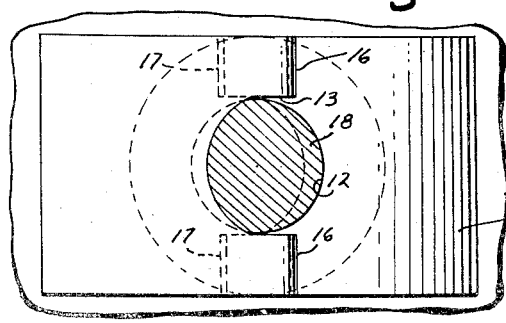

Fig. 3 is a cross sectional view of pieces of work having a bolt inserted through aligned holes and fastened therein by the nut of Figs. 1 and 2 which is seen in side elevation, Fig. 4 is a horizontal section taken along the line 4—4 of Fig. 3, Fig. 5 is an end elevation of the showing of Fig. 3, Fig. 6 is a top plan view of a blank for a nut similar to that of Figs. 1–5, particularly suitable for use with non-threaded posts, Fig. 7 is a view of a bolt inserted through work and having opposed notches for engagement with my improved nut formed from the blank of Fig. 6, the nut being seen in side elevation, Fig. 8 is a horizontal section taken along the line 8—8 of Fig. 7, Fig. 9 is an end elevation of the showing of Fig. 7, Fig. 10 is a blank similar to that of Figs. 1 and 6, but slightly modified, Fig. 11 is a side elevation of a nut formed from the blank of Fig. 10, Fig. 12 is a side elevation of the nut of Fig. 11 installed on a bolt, Fig. 13 is a horizontal section taken along the line 13—13 of Fig. 12, and Fig. 14 is an end elevation of the showing of Fig. 12.

More particularly 1 indicates a rectangular piece of sheet metal of selected size having an opening therethrough of generally oval shape in which the semi-circular ends 2 are connected by side portions 3 set back out of tangent relation therewith by distances 4. The blank is also preferably provided with depressed portions 5 to form stiffeners.

The blank 1 is folded along the dotted lines 6 into the form shown in Fig. 2. The semi-circular ends are thus drawn toward each other to the extent that one of the ends is at a level to engage one thread 7 of a screw and the other end engages another thread 8 of a threaded bolt 9. Figs. 3, 4 and 5 show the bolt 9 inserted through two pieces of sheet metal 10 and the nut threaded thereon. As the bolt is rotated to advance the threads the ends 11 of the nut flatten out to some extent, they bite into the work to some extent and the effect is to force the ends 2 toward each other and strongly against the threads. It will best be seen in Fig. 5 that the length of the offsets 4 is greater than the depth of the threads of the bolt 9.

In Fig. 6, the blank 11 has an opening of generally oval shape having rounded ends 12 connected by straight sided portions 13. The centers from which these rounded ends are described are at 14 and 15 on the bend lines 16 and 17 respectively. The fold is then made along the bend lines, as in Fig. 2, and the nut may then be inserted over a straight sided bolt or over a retaining post of plastic material or over a post 18 notched on opposite sides at 19 and 19a to receive the ends 12 when the nut is forced down onto the post as indicated in Figs. 7, 8 and 9. The numeral 20 indicates the work.

Fig. 10 shows a nut blank 21 similar to the blank 1 but without the stiffening ribs 5, although similar ribs may be provided if desired. The elongated cut-out has semi-circular ends 22 connected by sides 23 which are set back by distances 24. The folds are made along the bend lines 25, 26, 27 and 28 with one fold being made reversely from the other. In other words the fold line 25 is the top fold on one side and the diagonally opposite line 28 is the top fold on the other side, as best seen in Figs. 11 and 14. When a bolt 29 which is inserted through openings in work pieces 30 is inserted and advanced into the opening in the nut, there is a definite tilt to the ends of the nut with respect to each other and diagonally opposite corners thereof tend to dig into the work when the bolt 29 is rotated. The angle of tilt is such that one end 22 follows one thread and the other end 22 follows the next thread which is directly a continuation as best seen in Fig. 14.

What is claimed is:

1. The method of making a nut from a piece of sheet metal which consists in blanking out an elongated opening therefrom and in folding said piece on parallel spaced lines across said opening into a Z-shape, said fold and said elongated opening being so proportioned that a projected view of the hole through the finished nut is substantially round.

2. The method of making a nut from a piece of sheet metal which consists in blanking out an elongated opening therefrom having rounded ends with the connecting sides cut back, and in folding said piece along parallel spaced lines across said opening into a nut Z-shaped in side elevation, said fold and said side elongated opening being so proportioned that a projected view of the opening has diametrically opposed rounded portions connected by portions set back therefrom.

3. The method of making a nut from a piece of sheet metal which consists in blanking out an elongated opening therefrom and in folding said piece on parallel spaced lines across said opening into a Z-shape with the metal on one side of said opening being folded in one direction and the metal on the other side of said opening being folded in the other direction.

4. A sheet metal nut of Z-shape in which the upper and lower branches each have a rounded notch opening into its bent edge and in which the connecting branch has an opening throughout the length thereof connecting said notches.

5. A sheet metal nut of Z-shape having a continuous opening extending through all three of its branches, said opening being substantially round in projection, the upper and lower branches being elongated and bent downwardly for contact with work ahead of the connecting branch.

6. A sheet metal nut of Z-shape having a continuous opening extending through all three of its branches, said opening being substantially round in projection, the upper and lower branches being elongated and bent downwardly for contact with work ahead of the connecting branch, the said connecting branch being at an angle such that the upper and lower branches are separated by one full thread when mounted on a threaded bolt.

7. A sheet metal nut of Z-shape having a continuous opening extending through all three of its branches, said opening being substantially round in projection, the upper and lower branches being elongated and bent downwardly for contact with work ahead of the connecting branch, the angle of inclination of said upper and lower branches corresponding to the pitch angle of the threaded bolt upon which the nut is adapted to be mounted, said connecting branch being of such length and angularity that one full thread separates said upper and lower branches.

8. A sheet metal nut of Z-shape having elongated upper and lower branches curved downwardly and having an opening through all branches thereof generally round in projection.

9. In combination, sheet metal work having aligned openings therethrough, a bolt through said openings and a sheet metal nut securing said bolt in said openings, said nut being of Z-shape with its upper and lower branches elongated and bent downwardly toward said work.

10. In combination, sheet metal work having aligned openings therethrough, a bolt through said openings and a sheet metal nut securing said bolt in said openings, said nut being of Z-shape with its upper and lower branches elongated and bent downwardly on an angle to conform to the slope of the threads of said bolt and to contact said work at their outer ends.

11. A sheet metal nut having an opening therethrough and comprising a double fold on one side of the opening and a double fold in reverse order on the opposite side of the opening.

12. A sheet metal nut comprising a top branch, a bottom branch and a middle branch angularly disposed with respect to said top and bottom branches, said top and bottom branch each having a rounded cut-out extending to its edge adjacent said middle branch, said middle branch being cut-out on substantially parallel lines connecting the cut-outs of said top and bottom branches, one side of said middle branch being bent upwardly and the other side downwardly with respect to each of said other branches.

13. A sheet metal nut comprising a top branch, a bottom branch and a middle branch angularly disposed with respect to said top and bottom branches, said top and bottom branch each having a rounded cut-out extending to its edge adjacent said middle branch, said middle branch being cut-out on substantially parallel lines connecting the cut-outs of said top and bottom branches, one side of said middle branch being bent upwardly and the other side downwardly with respect to each of said other branches, the cut-outs of said upper and lower branches each having a radius equal to that of the base of the threads intended to be engaged thereby, the spacing between the sides of said middle branch exceeding the over-all diameter of said threads.

JAMES P. BURKE.